US006197890B1

(12) United States Patent
Okamura et al.

(10) Patent No.: US 6,197,890 B1
(45) Date of Patent: *Mar. 6, 2001

(54) RUBBER COMPOSITION CONTAINING SBR RUBBER, SOFTENER AND A BIS BENZOTHIAZOLYL DISULFIDE VULCANIZATION ACCELERATOR

(75) Inventors: Nobuyuki Okamura; Eiji Nakamura, both of Tokyo (JP)

(73) Assignee: Bridgestone Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/892,840

(22) Filed: Jul. 11, 1997

(30) Foreign Application Priority Data

Jul. 11, 1996 (JP) ...................................................... 8-182394

(51) Int. Cl.$^7$ ............................. C08C 19/20; B06C 11/00
(52) U.S. Cl. ..................... 525/332.7; 152/209.1; 525/349
(58) Field of Search ............... 525/332.7, 331.1, 525/331.8; 152/209.1, 564

(56) References Cited

U.S. PATENT DOCUMENTS 2,955,102 * 10/1960 Clayton ................................ 525/349

FOREIGN PATENT DOCUMENTS

| 96 256 | * 6/1963 | (DK) . | |
|---|---|---|---|
| 0030579 | 6/1981 | (EP) . | |
| 49-93361 | 9/1974 | (JP) . | |
| 56-139542 | 10/1981 | (JP) . | |
| 6-139542 | 10/1981 | (JP) | ............... C08L/21/00 |
| 58-87138 | 5/1983 | (JP) | ................... C08L/9/06 |

* cited by examiner

Primary Examiner—Christopher Henderson
(74) Attorney, Agent, or Firm—Sughrue, Mion, Zinn, Macpeak & Seas, PLLC

(57) ABSTRACT

The present invention provides a rubber composition for a tire tread which comprises 100 parts by weight of a rubber component comprising 50 parts by weight or more of SBR and the remaining amount of a synthetic rubber and/or natural rubber, 25 parts by weight or more of a softener, and 0.5 to 5.0 parts by weight of a vulcanization accelerator, such as bis(4-methylbenzothiazolyl-2)-disulfide, bis(5-methylbenzothiazolyl-2)-disulfide, mercapto-4-methylbenzothiazole, and mercapto-5-methylbenzothiazole, and a pneumatic tire produced by using this rubber composition. A tire having excellent controllability and ride quality throughout tire life can be provided.

26 Claims, No Drawings

RUBBER COMPOSITION CONTAINING SBR RUBBER, SOFTENER AND A BIS BENZOTHIAZOLYL DISULFIDE VULCANIZATION ACCELERATOR

BACKGROUND OF THE INVENTION

1. Field of the Invention

The present invention relates to a rubber composition for a tire tread and a pneumatic tire using the rubber composition, and more particularly, to a rubber composition for a tire tread which provides both an excellent controllability (herein after referred to as controllability) and an excellent vibration quality in a car ride (hereinafter referred to as ride quality) throughout its life, and a pneumatic tire using the rubber composition.

2. Description of the Related Art

Due to the recent higher power, the greater functionality, and the longer life among automobiles, it is required to provide tires achieving high levels in controllability and in ride quality simultaneously and maintain the performances on the road throughout its life. Particularly, as tires for passenger cars change from bias tires to radial tires and the aspect ratio of radial tires changes from 82 to 70, and further to 65, ride quality is not always improved even though controllability is remarkably improved. Therefore, it is strongly desired that both properties simultaneously exhibit high levels.

In order to satisfy the above-mentioned requirements, various rubber additives for a tire tread have been discussed. For example, regarding a vulcanization accelerator, Japanese Patent Application Laid-Open (JP-A) No. 58-87138 discloses that the resistant to thermoset and appearance of a tire in the final period of its use can be improved by using a rubber composition comprising a combination of a specific antioxidant and a specific vulcanization accelerator, yet nothing is mentioned about the improvement of tire performance, e.g., controllability and ride quality. In JP-A No. 56-139542, a specific vulcanization accelerator is disclosed, and it is therein described that the workability of a rubber composition, especially the scorching property upon kneading, can be improved by using this vulcanization accelerator, yet nothing is mentioned about tire performance using the vulcanization accelerator.

SUMMARY OF THE INVENTION

The object of the present invention is to provide a rubber composition for a tire tread which exhibits both excellent controllability and excellent ride quality throughout the tire life and a pneumatic tire using the rubber composition.

The present inventors focused on polymers and various ingredients mixed into a tread rubber composition, and it was discovered that the above object can be achieved by the following means.

Accordingly, the present invention provides:

(1) a rubber composition for a tire tread which comprises 100 parts by weight of a rubber component comprising 50 parts by weight or more of styrene-butadiene rubber (SBR) and a remaining amount of a synthetic rubber and/or natural rubber; as well as 25 parts by weight or more of a softener and 0.5 to 5.0 parts by weight of a vulcanization accelerator represented by the following general formula (I):

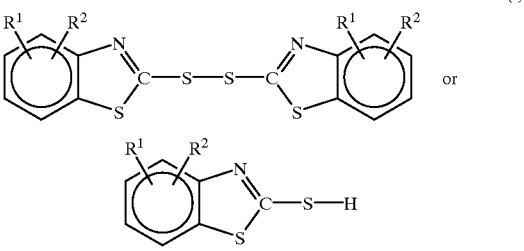

wherein $R^1$ and $R^2$ each independently represents an atom or a group selected from a group consisting of a hydrogen atom, alkyl groups, and aryl groups, excluding a case in which each of $R^1$ and $R^2$ simultaneously represents a hydrogen atom;

(2) a rubber composition according to (1), wherein the alkyl group represented by $R^1$ or $R^2$ is selected from alkyl groups having 1 to 6 carbon atoms;

(3) a rubber composition according to (2), wherein the alkyl group is a methyl group or an ethyl group;

(4) a rubber composition according to (1), wherein the aryl group represented by $R^1$ or $R^2$ is selected from aryl groups having 6 to 10 carbon atoms;

(5) a rubber composition according to (4), wherein the aryl group is a phenyl group;

(6) a rubber composition according to (1), wherein the vulcanizing accelerator is at least one type selected from a group consisting of bis(monoalkylbenzothiazolyl-2)-disulfides and 2-mercapto-monoalkylbenzothiazoles;

(7) a rubber composition according to (6), wherein the bis(monoalkylbenzothiazolyl-2)-disulfide is at least one type selected from a group consisting of bis(4-methyl-benzothiazolyl-2)-disulfide and bis(5-methylbenzo-thiazolyl-2)-disulfide;

(8) a rubber composition according to (6), wherein the 2-mercapto-monoalkylbenzothiazole is at least one type selected from a group consisting of 2-mercapto-4-methylbenzothiazole and 2-mercapto-5-methylbenzothiazole;

(9) a rubber composition according to (1), wherein the amount of SBR comprised in the rubber component is adjusted so that the styrene unit in SBR is 20% by weight or more of the total rubber component;

(10) a rubber composition according to (1), wherein SBR containing 30% to 70% by weight of styrene is comprised;

(11) a rubber composition according to (9), wherein SBR containing 30% to 70% by weight of styrene is comprised;

(12) a rubber composition according to (1), wherein the softener is an aromatic oil;

(13) a rubber composition according to (9), wherein the softener is an aromatic oil;

(14) a rubber composition according to (10), wherein the softener is an aromatic oil; and

(15) a pneumatic tire comprising a tread composed of a multilayeror a single layer, wherein the rubber composition of at least one of the layers comprises 100 parts by weight of a rubber component comprising 50 parts by weight or more of SBR and a remaining amount of a synthetic rubber and/or natural rubber; as well as 25 parts by weight or more of a softener and 0.5 to 5.0 parts by weight of a vulcanization accelerator represented by the following general formula (I):

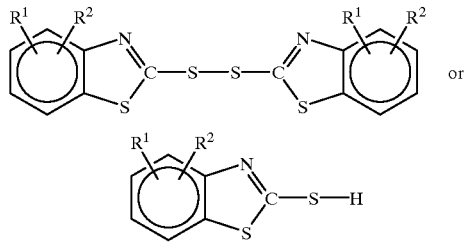

wherein $R^1$ and $R^2$ each independently represents an atom or a group selected from a group consisting of a hydrogen atom, alkyl groups, and aryl groups, excluding a case in which each of $R^1$ and $R^2$ simultaneously represents a hydrogen atom.

Moreover, in the pneumatic tire of the present invention, the rubber composition in the tread composed of a multi-layer or a single layer satisfies the conditions described in any one of (1) to (14).

An excellent effect is exhibited by each of the above mentioned rubber composition for a tire tread, such that the tire using the rubber composition in its tread can maintain high levels of controllability and ride quality throughout its life.

DETAILED DESCRIPTION OF THE INVENTION

In the present invention, it is necessary that the rubber composition comprises 50 parts by weight or more, preferably 70 parts by weight or more, of SBR per 100 parts by weight of the rubber component. When the amount of SBR is less than 50 parts by weight, controllability and ride quality are inferior, and such an amount is not preferable. It is also preferable that the content of SBR in the rubber component is adjusted so that the styrene unit in SBR is 20% by weight or more, preferably from 20% to 70% by weight, of the total rubber component. This means, for example, when 50 parts by weight of SBR is mixed with 50 parts by weight of natural rubber used as the other component of the rubber component, the content of the styrene unit in SBR should be 40% by weight or more.

In another embodiment, it is preferable that SBR containing 30% to 70% by weight of styrene is comprised in the rubber component. For example, when 10 parts by weight of SBR containing 35% by weight of styrene, 40 parts by weight of SBR containing 23.5% by weight of styrene, and 50 parts by weight of natural rubber are mixed together as the rubber composition, the obtained composition is also included in the present invention although the content of the styrene unit in total rubber component is less than 20% by weight.

An example of SBR used in the present invention may be, but is not limited to, commercially available emulsion polymerized SBR, solution polymerized SBR, and the like, so long as the SBR is satisfactory with regard to the above-mentioned requirements.

In the present invention, natural rubber, and synthetic rubbers, such as isoprene rubber, butadiene rubber, butyl rubber (including halogenated butyl rubber), and ethylene-propylene rubber, can be used in combination with SBR.

The rubber composition of the present invention comprises a softener in an amount of 25 parts by weight or more, preferably 25 to 60 parts by weight in view of the desired effect, per 100 parts by weight of the rubber component. When the amount of the softener is less than 25 parts by weight, ride quality is inferior, and such an amount is not preferable. An aromatic oil is preferably used as the softener. The aromatic oil is not particularly limited and can be selected from many types of commercially available aromatic oils.

It is necessary that the rubber composition of the present invention comprises 0.5 to 5.0 parts by weight of the vulcanization accelerator represented by the above general formula per 100 parts by weight of the rubber component. When the amount is less than 0.5 parts by weight, the effect of improving controllability and ride quality in the final period of tire use is negligible. When the amount exceeds 5.0 parts by weight, no further improvement in the effect can be found, and the amount is not preferable from the standpoint of economy.

In the above general formula representing the vulcanization accelerator used in the present invention, $R^1$ and $R^2$ each independently represents an atom or a group selected from a group consisting of a hydrogen atom, alkyl groups, and aryl groups, excluding a case in which each of $R^1$ and $R^2$ simultaneously represents a hydrogen atom. It is preferable that $R^1$ and $R^2$ each represents a hydrogen atom, an alkyl group having 1 to 6 carbon atoms, or an aryl group having 6 to 10 carbon atoms. It is even more preferable that $R^1$ and $R^2$ each represents a hydrogen atom, a methyl group, or an ethyl group.

Examples of the vulcanization accelerator include 2-mercapto-4-methylbenzothiazole, 2-mercapto-4-ethylbenzothiazole, 2-mercapto-5-methylbenzothiazole, 2-mercapto-5-ethylbenzothiazole, 2-mercapto-6-methylbenzothiazole, 2-mercapto-6-ethylbenzothiazole, 2-mercapto-4,5-dimethylbenzothiazole, 2-mercapto-4,5-diethylbenzothiazole, 2-mercapto-4-phenylbenzothiazole, 2-mercapto-5-phenylbenzothiazole, 2-mercapto-6-phenylbenzothiazole, bis(4-methylbenzothiazolyl-2)-disulfide, bis(4-ethylbenzothiazolyl-2)-disulfide, bis(5-methylbenzothiazolyl-2)-disulfide, bis(5-ethylbenzothiazolyl-2)-disulfide, bis(6-methylbenzothiazolyl-2)-disulfide, bis(6-ethylbenzothiazolyl-2)-disulfide, bis(4,5-dimethylbenzothiazolyl-2)-disulfide, bis(4,5-diethylbenzothiazolyl-2)-disulfide, bis(4-phenylbenzothiazolyl-2)-disulfide, bis(5-phenylbenzothiazolyl-2)-disulfide, and bis(6-phenylbenzothiazolyl-2)-disulfides, and the like. Among these compounds, bis(monoalkylbenzothiazolyl-2)-disulfides and 2-mercapto-monoalkylbenzothiazoles are preferable, and bis(4-methylbenzothiazolyl-2)-disulfide, bis(5-methylbenzothiazolyl-2)-disulfide, 2-mercapto-4-methylbenzothiazole, and 2-mercapto-5-methylbenzothiazole are even more preferable. These can be used solely or in combination of two or more.

The process for producing the vulcanization accelerator is not particularly limited. For example, the vulcanization accelerator can easily be produced in accordance with the process described in JP-A No. 49-93361 and the like.

In the rubber composition of the present invention, components generally used in rubber compositions for tires, such as carbon black, silica, zinc oxide, stearic acid, antioxidants, waxes, silane coupling agents, and vulcanizing agents, can suitably be comprised in combination with the above essential components within a range in which the effect of the present invention is not adversely affected.

Sulfur can be used as a vulcanizing agent. The amount of the vulcanizing agent is 0.1 to 5 parts by weight as a sulfur, preferably 1 to 2 parts by weight, per 100 parts by weight of the rubber component. When the amount is less than 0.1 part by weight, the strength at rupture and the abrasion resistance of the vulcanized rubber are decreased. When the amount exceeds 5 parts by weight, the rubber elasticity is inferior.

The rubber composition of the present invention can be obtained by mixing the components using a mixing machine, such as a roller, an internal mixer, and a Bambury mixer. The rubber composition is formed and vulcanized to be a tire tread.

It is known that the contribution of a tread rubber composition to controllability and ride quality of a tire varies to a great degree depending on hysteresis loss, viscoelasticity, tensile stress, hardness, Poisson's ratio of the rubber composition, and the temperature dependency of these factors. However, details of the contribution remains to be clarified. Although the mechanism of the individual contributions of the components of the present invention, i.e., the polymers, the softener, and the vulcanization accelerator, and the mechanism of synergistic effects by the combination of these components have yet to be elucidated, the mechanisms can be considered as follows. The tread is deformed by the roughness of the road surface, and the friction coefficient of the tire with the road surface is increased by energy loss caused by the deformation. The controllability of a tire is improved with the increase in the friction coefficient. When a large energy loss arises due to deformation of the tread, the tread rubber composition absorbs the impact caused by the roughness of the road surface as a damper does, and ride quality is improved. It is generally known that SBR, which can utilize the cohesive energy of styrene, and aromatic softeners are used for exhibiting this effect of energy loss. The longer the tire is used, the more this energy absorbing ability of the tread rubber composition decreases, and controllability and ride quality deteriorates. In contrast, when the vulcanization accelerator of the present invention is used in the tread rubber composition, the decrease in energy loss through the use of a tire is suppressed, and controllability and ride quality are maintained at high levels even in the final period of tire use. This advantage is considered to arise because the solubility of the vulcanization accelerator of the present invention with the polymers and aromatic softeners is better than that of conventional vulcanization accelerators.

EXAMPLES

The invention will be described in more detail with reference to examples below. The present invention is not, however, limited by the examples.

Various measurements were conducted in accordance with the following methods.

(1) Evaluation of Controllability

To evaluate the controllability of a new tire, a road test was conducted on a proving ground by using a four-door front-wheel-drive sedan on a dry asphalt road surface, and an overall evaluation was made by a test driver from the driving property, the braking property, response to steering, and controllability by steering. Then, the same tire as that tested above was used on 20,000 km of an ordinary public road, and controllability of the tire after use was evaluated.

(2) Evaluation of Ride Quality

A road test was conducted on a proving ground by using a four-door front-wheel-drive sedan on a dry asphalt road surface, and an overall evaluation was made based on the "feel" sensed by a test driver. A new tire and the same tire used over 20,000 km of road were evaluated.

The results of evaluations for controllability and ride quality are shown by the difference (signs) from corresponding control in terms of plus (+) or minus (−) The results for Comparative Examples 1, 2, 3 and 4, are used as controls for the results in Examples 1, 2, 3 and 4, respectively. The higher the number of pluses (+), the better the property.

Plus-or-minus zero (±0) means that the test driver could not distinguish any difference in properties between the test tire and the control. Plus one (+1) means that the property is better than that of the control to the degree that the test driver could detect a slight difference. Plus two (+2) means that the property is better than that of the control to the degree that the test driver could detect a clear difference.

Examples 1 to 4 and Comparative Examples 1 to 4

Components were mixed in accordance with the formulations shown in Table 1. Using the obtained rubber compositions for the tire tread, tires of size 185/70R14 having a single-layered tread were prepared and evaluated. The results are shown in Table 1.

As shown in Table 1, the tires prepared by using the rubber compositions of the present invention could maintain controllability and ride quality even in the final period of tire use.

In contrast, as shown by the results of Comparative Examples, the tires prepared by using the rubber compositions not containing the vulcanization accelerator described in the claims of the present invention showed controllability and ride quality inferior to those of the tires in Examples after use.

TABLE 1

|  | Example | | | | | | | |
|---|---|---|---|---|---|---|---|---|
|  | 1 | | 2 | | 3 | | 4 | |
|  | Comparative Example | | | | | | | |
|  | 1 | | 2 | | 3 | | 4 | |
| Formulation (parts by weight) | | | | | | | | |
| rubber material | | | | | | | | |
| SBR[1] | 100 | 100 | 50 | 50 | 100 | 100 | 60 | 60 |
| SBR[2] | — | — | — | — | — | — | 55 | 55 |
| natural rubber | — | — | 50 | 50 | — | — | — | — |
| aromatic oil | 25 | 25 | 25 | 25 | 40 | 40 | 15 | 15 |
| carbon black (ISAF) | 70 | 70 | 70 | 70 | 70 | 70 | 70 | 70 |
| wax | 2.0 | 2.0 | 2.0 | 2.0 | 2.0 | 2.0 | 2.0 | 2.0 |
| antioxidant TMDQ[3] | 0.5 | 0.5 | 0.5 | 0.5 | 0.5 | 0.5 | 0.5 | 0.5 |
| antioxidant IPPD[4] | 1.0 | 1.0 | 1.0 | 1.0 | 1.0 | 1.0 | 1.0 | 1.0 |
| stearic acid | 1.0 | 1.0 | 1.0 | 1.0 | 1.0 | 1.0 | 1.0 | 1.0 |
| zinc oxide | 3.0 | 3.0 | 3.0 | 3.0 | 3.0 | 3.0 | 3.0 | 3.0 |
| accelerator TBBS[5] | 0.5 | 0.5 | 0.5 | 0.5 | 0.5 | 0.5 | 0.5 | 0.5 |
| accelerator MBTS[6] | 0.5 | — | 0.5 | — | 0.5 | — | 0.5 | — |
| accelerator DPG[7] | 0.5 | 0.5 | 0.2 | 0.2 | 0.5 | 0.5 | 0.5 | 0.5 |
| accelerator MMBTS[8] | — | 1.0 | — | 1.0 | — | 1.0 | — | 1.0 |
| sulfur | 1.8 | 1.8 | 1.8 | 1.8 | 1.8 | 1.8 | 1.8 | 1.8 |
| total oil | 25 | 25 | 25 | 25 | 40 | 40 | 30 | 30 |
| total styrene content[9] | 23.5 | 23.5 | 11.75 | 11.75 | 23.5 | 23.5 | 28.1 | 28.1 |
| Tire properties | | | | | | | | |
| controllability | | | | | | | | |
| before use | c | ±0 | c | ±0 | c | +1 | c | +1 |
| after use | c | +1 | c | +1 | c | +2 | c | +2 |

TABLE 1-continued

| | Example | | | | | | | |
|---|---|---|---|---|---|---|---|---|
| | 1 | | 2 | | 3 | | 4 | |
| | | | Comparative Example | | | | | |
| | | 1 | | 2 | | 3 | | 4 |
| ride quality | | | | | | | | |
| before use | c | ±0 | c | ±0 | c | −1 | c | ±0 |
| after use | c | +2 | c | +1 | c | +2 | c | +2 |

1) SBR 1500 (styrene content, 23.5% by weight; product of Japan synthetic Rubber Co., LTD.)
2) SBR 0120 (styrene content, 35% by weight; 37.5% oil extended; product of Japan Synthetic Rubber Co., Ltd.)
3) TMDQ: polymer of 2,2,4-trimethyl-1,2-dihydroquinoline
4) IPPD: N-isopropyl-N'-phenyl-p-phenylenediamine
5) TBBS: N-t-butyl-2-benzothiazolylsulfenamide
6) MBTS: bis(benzothiazolyl-2)-disulfide
7) DPG: diphenylguanidine
8) MMBTS: bis(4-methylbenzothiazolyl-2)-disulfide
9) % by weight of rubber component
c: control

What is claimed is:

1. A rubber composition for a tire tread which comprises 100 parts by weight of a rubber component comprising 50 parts by weight or more of SBR and a remaining amount of a synthetic rubber and/or natural rubber; at least 25 parts by weight of a softener and 0.5 to 5.0 parts by weight of a vulcanization accelerator represented by the following general formula (I)

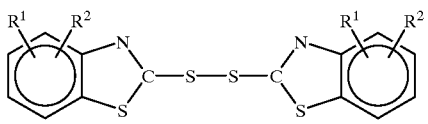

(I)

wherein $R^1$ and $R^2$ each independently represents an atom or a group selected from a group consisting of a hydrogen atom, alkyl groups, and aryl groups, excluding a case in which each of $R^1$ and $R^2$ simultaneously represents a hydrogen atom.

2. A rubber composition according to claim 1, wherein the alkyl group represented by $R^1$ or $R^2$ is selected from alkyl groups having 1 to 6 carbon atoms.

3. A rubber composition according to claim 2, wherein the alkyl group is a methyl group or an ethyl group.

4. A rubber composition according to claim 1, wherein the aryl group represented by $R^1$ or $R^2$ is selected from aryl groups having 6 to 10 carbon atoms.

5. A rubber composition according to claim 4, wherein the aryl group is a phenyl group.

6. A rubber composition according to claim 1, wherein the vulcanization accelerator is at least one type selected from a group consisting of bis(monoalkylbenzothiazolyl-2)-disulfides.

7. A rubber composition according to claim 6, wherein the bis(monoalkylbenzothiazolyl-2)-disulfide is at least one type selected from a group consisting of bis(4-methylbenzothiazolyl-2)-disulfide and bis(5-methylbenzothiazolyl-2)-disulfide.

8. A rubber composition according to claim 1, wherein an amount of SBR comprised in the rubber component is adjusted so that the styrene unit in SBR is comprised 20% by weight or more of the total rubber component.

9. A rubber composition according to claim 1, wherein a SBR containing 30% to 70% by weight of styrene is comprised in the rubber component.

10. A rubber composition according to claim 8, wherein a SBR containing 30% to 70% by weight of styrene is comprised in the rubber component.

11. A rubber composition according to claim 1, wherein the softener is an aromatic oil.

12. A rubber composition according to claim 8, wherein the softener is an aromatic oil.

13. A rubber composition according to claim 9, wherein the softener is an aromatic oil.

14. A pneumatic tire comprising a tread layer composed of a multilayer or a single layer, wherein the rubber composition of at least one of the layers comprises the rubber composition of claim 1.

15. A pneumatic tire comprising a tread layer composed of a multilayer or a single layer, wherein the rubber composition of at least one of the layers comprises the rubber composition of claim 2.

16. A pneumatic tire comprising a tread layer composed of a multilayer or a single layer, wherein the rubber composition of at least one of the layers comprises the rubber composition of claim 3.

17. A pneumatic tire comprising a tread layer composed of a multilayer or a single layer, wherein the rubber composition of at least one of the layers comprises the rubber composition of claim 4.

18. A pneumatic tire comprising a tread layer composed of a multilayer or a single layer, wherein the rubber composition of at least one of the layers comprises the rubber composition of claim 5.

19. A pneumatic tire comprising a tread layer composed of a multilayer or a single layer, wherein the rubber composition of at least one of the layers comprises the rubber composition of claim 6.

20. A pneumatic tire comprising a tread layer composed of a multilayer or a single layer, wherein the rubber composition of at least one of the layers comprises the rubber composition of claim 7.

21. A pneumatic tire comprising a tread layer composed of a multilayer or a single layer, wherein the rubber composition of at least one of the layers comprises the rubber composition of claim 8.

22. A pneumatic tire comprising a tread layer composed of a multilayer or a single layer, wherein the rubber composition of at least one of the layers comprises the rubber composition of claim 9.

23. A pneumatic tire comprising a tread layer composed of a multilayer or a single layers, wherein the rubber composition of at least one of the layers comprises the rubber composition of claim 10.

24. A pneumatic tire comprising a tread layer composed of a multilayer or a single layer, wherein the rubber composition of at least one of the layers comprises the rubber composition of claim 11.

25. A pneumatic tire comprising a tread layer composed of a multilayer or a single layer, wherein the rubber composition of at least one of the layers comprises the rubber composition of claim 12.

26. A pneumatic tire comprising a tread layer composed of a multilayer or a single layer, wherein the rubber composition of at least one of the layers comprises the rubber composition of claim 13.

* * * * *